US 9,689,416 B2

(12) United States Patent
Tamm et al.

(10) Patent No.: US 9,689,416 B2
(45) Date of Patent: Jun. 27, 2017

(54) TORQUE LIMITING SET SCREW

(71) Applicant: Classic Connectors, Trussville, AL (US)

(72) Inventors: Carl Russel Tamm, Trussville, AL (US); Randy L. Wolf, Trussville, AL (US)

(73) Assignee: Classic Connectors, Inc., Trussville, AL (US)

( * ) Notice: Subject to any disclaimer, the term of this patent is extended or adjusted under 35 U.S.C. 154(b) by 101 days.

(21) Appl. No.: 14/560,197

(22) Filed: Dec. 4, 2014

(65) Prior Publication Data

US 2016/0160902 A1 Jun. 9, 2016

(51) Int. Cl.
| F16B 31/00 | (2006.01) |
| F16B 31/02 | (2006.01) |
| F16B 35/00 | (2006.01) |

(52) U.S. Cl.
CPC .......... *F16B 31/021* (2013.01); *F16B 35/005* (2013.01)

(58) Field of Classification Search
CPC ....... F16B 31/021; F16B 31/00; F16B 35/005
USPC ............................................ 411/393, 2, 3, 5
See application file for complete search history.

(56) References Cited

U.S. PATENT DOCUMENTS

| 3,876,279 | A | 4/1975 | Underwood |
| 4,199,216 | A | 4/1980 | Gryctko |
| 4,492,500 | A | 1/1985 | Ewing |
| 5,697,929 | A | 12/1997 | Mellinger |
| 6,042,430 | A | 3/2000 | Hollick |
| 6,224,596 | B1 * | 5/2001 | Jackson ............. A61B 17/7032 411/5 |
| 6,261,039 | B1 * | 7/2001 | Reed ......................... B23P 6/04 411/178 |
| 6,478,795 | B1 * | 11/2002 | Gournay ............ A61B 17/7049 411/5 |
| 6,802,680 | B1 | 10/2004 | Rubenstein |
| 7,214,108 | B2 | 5/2007 | Barnett |
| 7,641,674 | B2 * | 1/2010 | Young ................ A61B 17/7032 411/393 |
| 8,317,443 | B2 * | 11/2012 | Stauch .................. F16B 31/021 411/2 |

(Continued)

FOREIGN PATENT DOCUMENTS

| DE | 44 36 906 | * 4/1996 |
| EP | 0692643 A1 | 1/1996 |

(Continued)

*Primary Examiner* — Flemming Saether
(74) *Attorney, Agent, or Firm* — The Watson I.P. Group, PLC; Jovan N. Jovanovic; Vladan M. Vasiljevic

(57) ABSTRACT

A torque limiting fastener comprising a body. The body includes a threadform, an inner bore and a controlled break region. The body defines an elongated body extending from a first end to a second end, and the body includes an outer surface. The threadform extends at least partially between the first end and the second end along the outer surface. The inner bore extends from the second end at least partially toward the first end of the body. The controlled break region is positioned between the inner bore and the outer surface. The controlled break region includes an outer surface break point formed into the outer surface and an inner surface break point formed into the inner bore. The outer surface break point and the inner surface break point defining a shear plane therebetween.

16 Claims, 2 Drawing Sheets

(56) References Cited

U.S. PATENT DOCUMENTS

2007/0253792 A1    11/2007    Zahnen et al.

FOREIGN PATENT DOCUMENTS

| EP | 1536734 | B1 | 5/2007 |
| EP | 2071201 | A1 | 6/2009 |
| RU | 2215914 | C2 | 11/2003 |

* cited by examiner

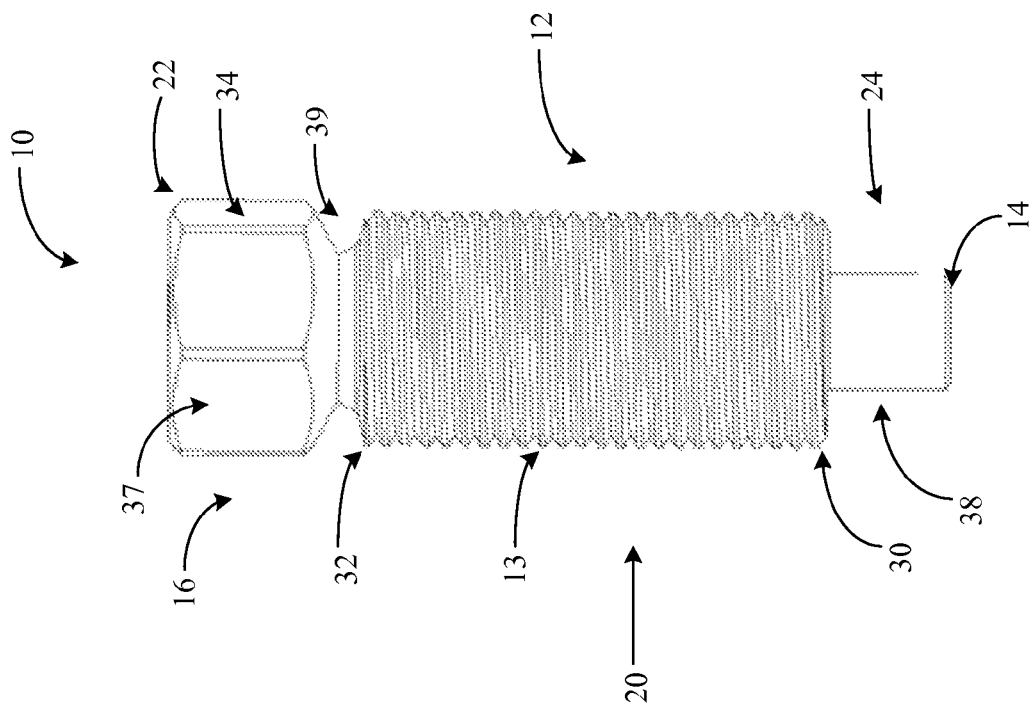
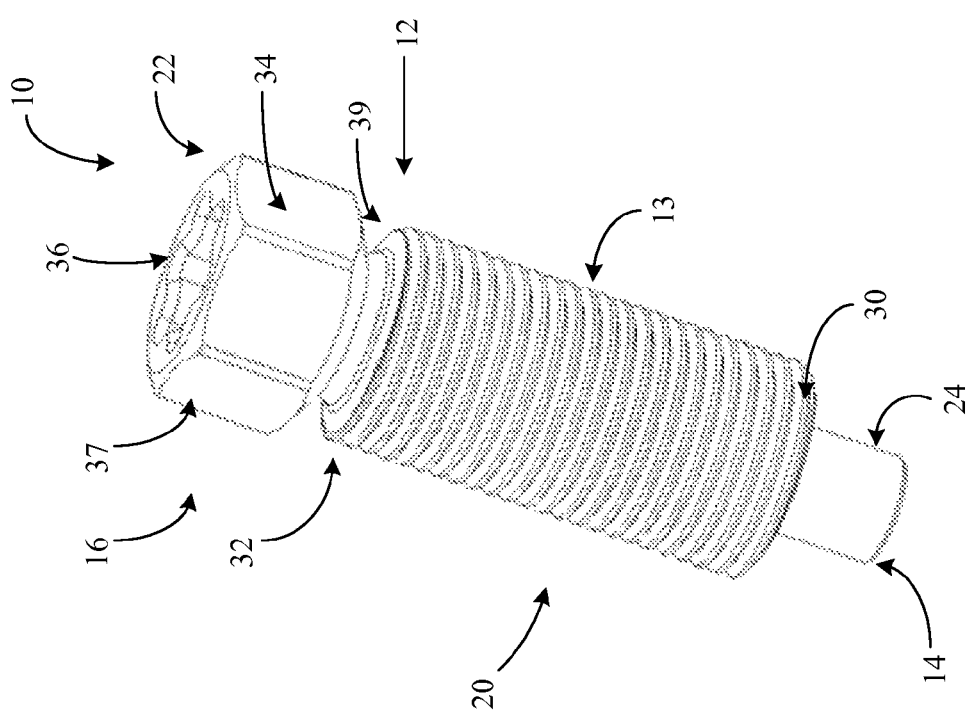
Figure 1
Figure 2

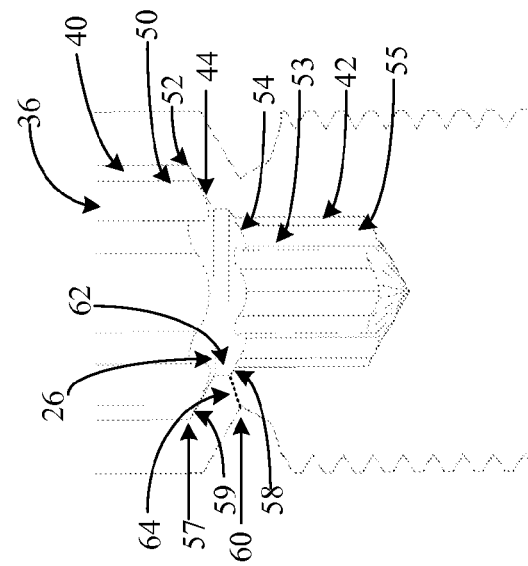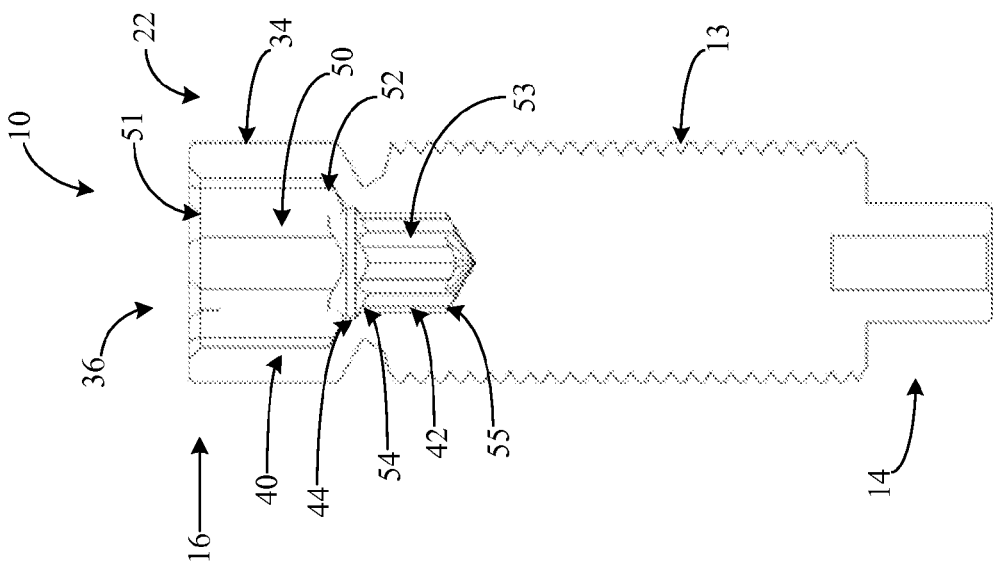
Figure 4
Figure 3

TORQUE LIMITING SET SCREW

CROSS-REFERENCE TO RELATED APPLICATION

N/A

BACKGROUND OF THE DISCLOSURE

1. Field of the Disclosure

The invention relates in general to fasteners, and more particularly, to a torque limiting fastener which is configured to controllably break forming a shear plane, while allowing for access to an internal bore for use with a tool.

2. Background Art

The use of torque limiting fasteners is known in the art. In particular, such fasteners typically include a threadform. When the threadform is engaged and the fastener is tightened, eventually, the torque required to further tighten the fastener exceeds the strength of the fastener, and the fastener controllably breaks to preclude further tightening. Thus, it is known, at the point of breaking, that the torque of the fastener matches the strength of the fastener.

While such fasteners are known in the art, there are problems associated with such prior art fasteners. For example, it is often difficult to accurately set the torque at which the fastener breaks. It is further difficult to manipulate the fastener after the fastener controllably breaks. It is further difficult to provide for accurate and predetermined breakage formations on the fastener after breaking.

SUMMARY OF THE DISCLOSURE

The disclosure is directed to a torque limiting fastener comprising a body. The body includes a threadform, an inner bore and a controlled break region. The body defines an elongated body extending from a first end to a second end, and the body includes an outer surface. The threadform extends at least partially between the first end and the second end along the outer surface. The inner bore extends from the second end at least partially toward the first end of the body. The controlled break region is positioned between the inner bore and the outer surface. The controlled break region includes an outer surface break point formed into the outer surface and an inner surface break point formed into the inner bore. The outer surface break point and the inner surface break point defining a shear plane therebetween.

In some configurations, the outer surface break point comprises a groove extending into the outer surface toward the inner bore. The inner surface break point is defined along the inner bore so as to define the shear plane along the weakest plane therebetween.

In some configurations, the outer surface break point is closer to the first end of the body than the inner surface break point. Such a configuration, in turn, defines a substantially frusto-conical configuration extending from the inner surface break point toward outwardly to the outer surface break point, and, downwardly toward the first end.

In some configurations, the inner bore includes a proximal region and a distal region. The proximal region extends from the second end to a transition region. The distal region extends from the transition region toward the first end of the body. The inner surface break point being positioned within the transition region.

In some configurations, the distal region of the inner bore is configured to retain a first tool capable of rotating the fastener along a longitudinal axis thereof. The proximal region of the inner bore is configured to retain a second tool capable of rotating the fastener along a longitudinal axis.

In some configurations, the distal region and the proximal region have different configurations, such that the first tool and the second tool are distinct.

In some configurations, the distal region of the inner bore has a cross-sectional configuration which is smaller than that of the proximal region of the inner bore.

In some configurations, the torque limiting fastener further includes a head having an outer surface configured to be retained by a tool. The threadform has a starting thread positioned proximate the first end and an ending thread positioned proximate the second end.

In some configurations, the head and the threadform are spaced apart from each other by a gap. The outer surface break point being positioned within the gap.

In some configurations, the inner bore includes a proximal region and a distal region. The proximal region extends from the second end to a transition region. The distal region extends from the transition region toward the first end of the body. The inner surface break point is positioned within the transition region. At least a majority of the proximal region is positioned between the gap and the second end, with a majority of the distal end positioned between the gap and the first end.

In some configurations, the transition region corresponds to the gap.

In some configurations, the transition region includes a chamfered wall that is directed both inwardly and toward the first end.

In some configurations, the threadform has a substantially uniform diameter between a starting thread and an ending thread.

In some configurations, the body is formed from an aluminum member.

In some configurations, the shear plane comprises one of a frusto-conical configuration, an inverted frusto-conical configuration and a planar disc configuration.

In some configurations, the breaking of the fastener along the shear plane does not distort a portion of the inner bore between the shear plane and the first end, to, in turn, allow for the insertion of a tool within the portion of the inner bore.

BRIEF DESCRIPTION OF THE DRAWINGS

The disclosure will now be described with reference to the drawings wherein:

FIG. 1 of the drawings is a perspective view of the torque limiting fastener;

FIG. 2 of the drawings is a side elevational view of the torque limiting fastener;

FIG. 3 of the drawings is a cross-sectional view of the torque limiting fastener; and FIG. 4 of the drawings is a partial cross-sectional view of the torque limiting fastener, showing, in particular, the controlled break region and the inner bore.

DETAILED DESCRIPTION OF THE DISCLOSURE

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the torque limiting fastener is shown generally at 10. The torque limiting fastener is defined by body 12 which includes threadform 20, head 22, distal end structure 24 and controlled break region 26 (FIG. 4). The body 12 extends from first end 14 to second end 16, and generally comprises an elongated configuration having a generally circular cross-sectional configuration along the threadform with an outer surface 13. Generally, the length of the fastener exceeds the diameter of the body proximate the threadform, although variations are contemplated.

The fastener is shown as comprising a monolithic component formed from a metal or alloy thereof. In some configurations, additional features or separate components may be coupled to the body, at the first end, the second end or a point therebetween. In the contemplated configuration, the body 12 comprises a single formed aluminum or aluminum alloy member, without limitation. In other configurations, a number of different materials are contemplated for use.

The threadform 20 extends between the first end 14 and the second end 16. The threadform is defined by starting thread 30 and ending thread 32. It will be understood that the threadform may be continuous between the starting thread and the ending thread, and substantially uniform. In other configurations, variations are contemplated as well as spacing or breaks in the threads for various purposes. In the configuration illustrated, the threadform stops short of the head 22 and the distal end structure 24. In other embodiments, the threadform may extend to the first end 14 and/or to the second end 16.

Head 22 is positioned at or near the second end 16 and includes outer surface 34 as well as inner bore 36. The outer surface 34 includes a plurality of faces 37 which are configured for the receipt thereby by a tool, such as a spanner, socket or the like. In the configuration shown, the faces 37 define a hexagonal configuration. Other configurations are likewise contemplated. In certain embodiments, the outer surface may comprise a circular surface which is not configured for coupling by a tool (i.e., other than, for example, locking pliers or the like). In still other configurations, the threadform may extend to the first end 14, and the head may have an outer surface that merely matches the threadform. In certain configurations, the outer surface may include multiple tool engagement portions of varying sizes, with the outer surface breakpoint being therebetween (as will be described below). In the configuration shown, the head has a cross-sectional configuration that corresponds to the threadform, such that the footprint of the head is smaller than or approximately the same size as the threadform.

The inner bore 36 is shown in FIG. 3 as comprising proximal region 40, distal region 42, and transition region 44. The inner bore is configured to accept a tool or the like for purposes of tightening or loosening the fastener. In the configuration shown, the inner bore is configured to receive a plurality of differently sized tools. That is, one size of tool is configured to be retained by the distal region 42. Another size of tool is configured to be retained by the proximal end 40. In other configurations, the inner bore may be sized so as to accept a single tool (that is, other than the inner surface breakpoint, the inner bore may be substantially uniformly configured). While a six lobe drive type of tool receiver is shown, a number of others are contemplated, including, but not limited to allen, square, double square, triple square, spline drive configurations, as well as security configurations, among others.

In the configuration shown, the proximal region 40 includes inner surface 50 which is formed from a plurality of faces that extend from the top end 51 to the bottom end 52 of the inner surface 50. In the configuration shown, the proximal region is configured to receive a six lobe drive type tool of a particular desired size. Of course, other configurations are likewise contemplated, such as internal hex head configurations, among others. The distal region 42 is configured to retain a tool of a smaller configuration, i.e., a second tool. In the configuration shown, the distal region 42 comprises inner surface 53 which extends from top end 54 to bottom end 55. The inner surface of the distal region 42 comprises a configuration suitable for the receipt of a six lobe drive type tool which is smaller than the tool configured for engagement with the proximal region. Both the proximal region and the distal region are configured to be coaxially located (although variations are contemplated).

The transition region 44 lies between the bottom end 52 of the proximal region 40 and the top end 54 of the distal region 42. The transition region includes top end 57 and bottom end 58 which corresponds thereto, and chamfer wall 59 spanning therebetween. The chamfer wall 59 may be continuous and uniform, or may include surface variations. As will be understood, the transition region in the present configuration forms a portion of the inner surface breakpoint.

In other configurations, the proximal region and the distal region may comprise a configuration that receives the same size tool, with the transition region extending between the two regions to provide the controlled break region 26. That is, a surface variation may be presented along the inner bore with the opposing sides of the inner bore (the proximal region and the distal region) comprising substantially the same configuration.

The distal end structure 24 may comprise a number of different configurations. In the present configuration, the distal end structure 24 defines a cylindrical engagement region 38 which includes an outer surface and an inner bore. The configuration is useful for some applications, including, but not limited to the application disclosed in U.S. patent application Ser. No. 14/514,316, entitled "Fastener for a Connector in an Electrical Coupling" filed Oct. 14, 2014, the entire specification of which is hereby incorporated by reference in its entirety. In other configurations, the threadform may extend to the first end 14 of the body 12, with the starting thread corresponding to the distal end structure. In other configurations, the distal end structure may comprise a tapered end, or another configuration that would be known to one of skill in the art. The particular type of distal end structure is not to be deemed limiting, but rather is shown for purposes of example, solely.

The controlled break region 26 is shown in FIG. 4 as comprising outer surface break point 60, inner surface breakpoint 62, which cooperate to define the plane 64 of breaking therebetween. The outer surface break point 60 comprises a groove that is formed into the outer surface of the body, and, in the configuration shown, between the head 22 and the threadform 20 at gap 39. More particularly, the groove includes a valley with a point of greatest depression (which minimizes the effective diameter of the body 12, locally). So as to concentrate the stress, the point of greatest depression comprises a point in cross-section, so as to effectively define a line about the circumference of the outer surface of the body 12. In other configurations, the point of greatest depression may define a plane instead of a line (that is, the point of greatest depression may have a greater width along the outer surface).

The inner surface break point 62 is defined by a point (in cross-section), or a band along the inner circumference of the inner bore at the transition region, which cooperatively with the outer surface break point 60 defines a weakest region of the body 12 thereabout. In the present configuration, the point 62 defines a region of minimum thickness between outer surface break point 60 and the point 62. Thus, when a predetermined torque of the fastener is reached that exceeds the strength of the fastener at the weakest point (defined by the shear plane 64 between the outer surface break point and the inner surface breakpoint, the fastener controllably breaks therebetween along the shear plane 64.

A number of different configurations are contemplated for the relationship and positioning of each one of the inner surface break point 62 and the outer surface break point 60. In the configuration shown, the two are slightly offset, that is, the outer surface break point 60 is positioned slightly closer to the first end 14 of the body than the inner surface break point 62. Thus, the shear plane 64 angles downwardly from the inner surface break point to the outer surface break point, defining a frusto-conical configuration (i.e., oblique to the axis of the fastener). In other configurations, the shear plane 64 may extend directly across with the outer surface break point and the inner surface break point being spaced the same distance apart from the first end 14 so as to define a shear plane 64 that defines a planar disc. In still other configurations, it is contemplated that the shear plane may be varied across the fastener, with the outer surface break point and the inner surface break point being varied along the outer and inner surfaces of the body, respectively. In still other configurations, the outer surface break point may be closer to the second end 16 than the inner surface breakpoint, such that the shear plane slopes inwardly toward the inner bore 36, thereby defining an inverted frusto-conical configuration. It will be understood that by varying the outer surface break point and the inner surface break point, a different relative thickness (that is, the shear plane length) can be defined. Thus, the same fastener blank can be configured to different torque values, based upon the relative positioning of the outer surface break point and the inner surface break point, and, in turn, the effective length of the shear plane (defined by the distance between the outer surface break point and the inner surface break point).

It will also be understood that while a single controlled break region is utilized, multiple controlled break regions are contemplated. That is, a plurality of regions may be spaced along the body between the first end and the second end of the body 12. Each of the regions may be configured to break at differing torque values, such that the same fastener can be set to different torque values successively. In other configurations, a single controlled break region is contemplated.

It will further be understood that the outer surface break point 60 may be positioned along the threadform 20 where there is no head and the threadform extends to the second end 16 of the body. In other configurations, the outer surface break point 60 may be positioned along the threadform and below the head and the gap between the head and the threadform. In still other configurations, the controlled break region may occur along the head 22 between the gap 39 and the second end 16.

Advantageously, with the inclusion of an inner bore, a controlled break region can be defined between the inner bore and the outer bore. In such a manner, the fastener can be loosened and tightened after the initial breaking, as the shear plane is controlled between the inner bore and the outer surface.

In operation, the torque limiting fastener 10 is threaded onto a threaded portion or fastener or the like. As the torque limiting fastener is tightened, eventually, the torque exerted on the fastener exceeds the strength of the fastener along the controlled break region 26. Once this point is reached, additional torque will break the fastener, rather than further tighten the fastener.

In more detail, the fastener breaks along the controlled break region 26. That is, the shear plane is formed from the outer surface break point 60 (outer weakening) to the inner surface break point 62 (inner weakening), thereby defining the shear plane. Due to the relative positioning of the outer surface and inner surface break points, the shear plane, in the configuration shown, comprises a generally frustoconical configuration. Advantageously, the shear plane is formed so that the shear plane does not obstruct access to the distal region 42 of the inner bore 36 (whereas the head and the proximal region of the inner bore have broken away). Moreover that distal region is precluded from deformation, such that insertion of the tool is not limited or compromised. Thus, a tool can be inserted into the distal region 42 of the inner bore 36 to loosen (or further tighten) the fastener.

While the body has experienced a full break along a predetermined plane defined by the outer and inner surface break points, it will be understood that the shear plane that has developed nevertheless allows for the access to the distal region for purposes of engaging the fastener with a second tool. Devices of prior art do not provide such precise predetermined shear plane, therefore the inner portion tends to tear randomly over a larger area, resulting in nondescript edges being stretched, bent, or distorted in positions which impede the ready introduction of said second tool. This is of particular importance in some instances, such as "hot line" work, where a lineman may be accessing the fastener with a tool mounted on an insulated stick perhaps 3 meters long, and any foreign material greatly impedes access for the tool.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A torque limiting fastener comprising:
   a body defining an elongated body extending from a first end to a second end, and including an outer surface, the body including:
     a threadform extending at least partially between the first end and the second end along the outer surface;
     an inner bore extending from the second end at least partially toward the first end of the body; and
     an controlled break region positioned between the inner bore and the outer surface, the controlled break region including a portion having circular cross-sectional configuration and including an outer surface break point formed into the outer surface and an inner surface break point formed into the inner bore, the outer surface break point and the inner surface break point defining a shear plane therebetween,
   wherein the outer surface break point comprises a groove extending into the outer surface toward the inner bore, and the inner surface break point is defined along the inner bore so as to define the shear plane along the weakest plane therebetween, with the inner surface break point being at a point along the circular cross-sectional configuration of the controlled break region; and wherein the outer surface break point is closer to the first end of the body than the inner surface break point, to in turn, define a substantially frusto-conical configuration extending from the inner surface break point toward outwardly to the outer surface break point, and, downwardly toward the first end.

2. The torque limiting fastener of claim 1 wherein the inner bore includes a proximal region and a distal region, the proximal region extending from the second end to a transition region, the distal region extending from the transition region toward the first end of the body, with the inner surface break point being positioned within the transition region.

3. The torque limiting fastener of claim 2 wherein the distal region of the inner bore is configured to retain a first tool capable of rotating the fastener along a longitudinal axis thereof, and the proximal region of the inner bore is configured to retain a second tool capable of rotating the fastener along a longitudinal axis.

4. The torque limiting fastener of claim 3 wherein the distal region and the proximal region have different configurations, such that the first tool and the second tool are distinct.

5. The torque limiting fastener of claim 4 wherein the distal region of the inner bore has a cross-sectional configuration which is smaller than that of the proximal region of the inner bore.

6. The torque limiting fastener of claim 1 wherein the body further comprises a head positioned at the second end having an outer surface configured to be retained by a tool, the threadform having a starting thread positioned proximate the first end and an ending thread extending toward the head, proximate the second end.

7. The torque limiting fastener of claim 6 wherein the head and the threadform are spaced apart from each other by a gap, with the outer surface break point being positioned within the gap.

8. The torque limiting fastener of claim 7 wherein the inner bore includes a proximal region and a distal region, the proximal region extending from the second end to a transition region, the distal region extending from the transition region toward the first end of the body, with the inner surface break point being positioned within the transition region, and wherein at least a majority of the proximal region is positioned between the gap and the second end, with a majority of the distal end positioned between the gap and the first end.

9. The torque limiting fastener of claim 8 wherein the transition region corresponds to the gap.

10. The torque limiting fastener of claim 9 wherein the transition region includes a chamfered wall that is directed both inwardly and toward the first end.

11. The torque limiting fastener of claim 1 wherein the threadform has a substantially uniform diameter between a starting thread and an ending thread.

12. The torque limiting fastener of claim 1 wherein the body is formed from an aluminum member.

13. The torque limiting fastener of claim 1 wherein the shear plane comprises one of a frusto-conical configuration, an inverted frusto-conical configuration and a planar disc configuration.

14. The torque limiting fastener of claim 1 wherein breaking of the fastener along the shear plane does not distort a portion of the inner bore between the shear plane and the first end, to, in turn, allow for the insertion of a tool within the portion of the inner bore.

15. The torque limiting fastener of claim 1 wherein the distal region of the inner bore has a cross-sectional configuration which is smaller than that of the proximal region of the inner bore and the transition region has a cross-sectional configuration that is larger than that of the distal region and smaller than that of the proximal region.

16. The torque limiting fastener of claim 1 wherein a portion of the transition region comprises a cylindrical configuration.

* * * * *